United States Patent
Shiraiwa et al.

[15] 3,670,239
[45] June 13, 1972

[54] METHOD AND APPARATUS FOR MAGNETIC FLAW DETECTION BY USING MAGNETO-SENSITIVE DIODES

[72] Inventors: Toshio Shiraiwa, Ikoma; Tatsuo Hiroshima, Minoo, both of Japan

[73] Assignee: Sumitomo Metal Industries Limited, Osaka Japan

[22] Filed: March 19, 1970

[21] Appl. No.: 21,062

[52] U.S. Cl. ...............................324/37, 324/43 R
[51] Int. Cl. ...............................................G01r 33/12
[58] Field of Search..................324/37, 40, 43, 45, 46

[56] References Cited

UNITED STATES PATENTS

| 3,579,099 | 5/1971 | Kanbayashi | 324/37 |
| 3,166,710 | 1/1965 | Schmidt | 324/37 |
| 3,004,215 | 10/1961 | Patt et al | 324/37 |
| 3,025,460 | 3/1962 | Callan et al | 324/37 |

FOREIGN PATENTS OR APPLICATIONS

| 950,696 | 2/1964 | Great Britain | 324/37 |

OTHER PUBLICATIONS

Sony Magnetodiode; Sony Corporation Publication; 4 pages.

Primary Examiner—Rudolph V. Rolinec
Assistant Examiner—R. J. Corcoran
Attorney—Watson, Cole, Grindle & Watson

[57] ABSTRACT

This invention relates to method and apparatus for inspecting flaws, herein magneto-sensitive diodes are used so as to provide a remarkably higher detecting sensitivity than of the conventional detector such as a search coil or Hall generator.

4 Claims, 25 Drawing Figures

PATENTED JUN 13 1972 3,670,239

INVENTORS,
TOSHIO SHIRAIWA
TATSUO HIROSHIMA

BY *Watson, Cole, Grindle & Watson*
ATTORNEYS

INVENTORS
TOSHIO SHIRAIWA
TATSUO HIROSHIMA

BY Watson, Cole, Grindle & Watson
ATTORNEYS

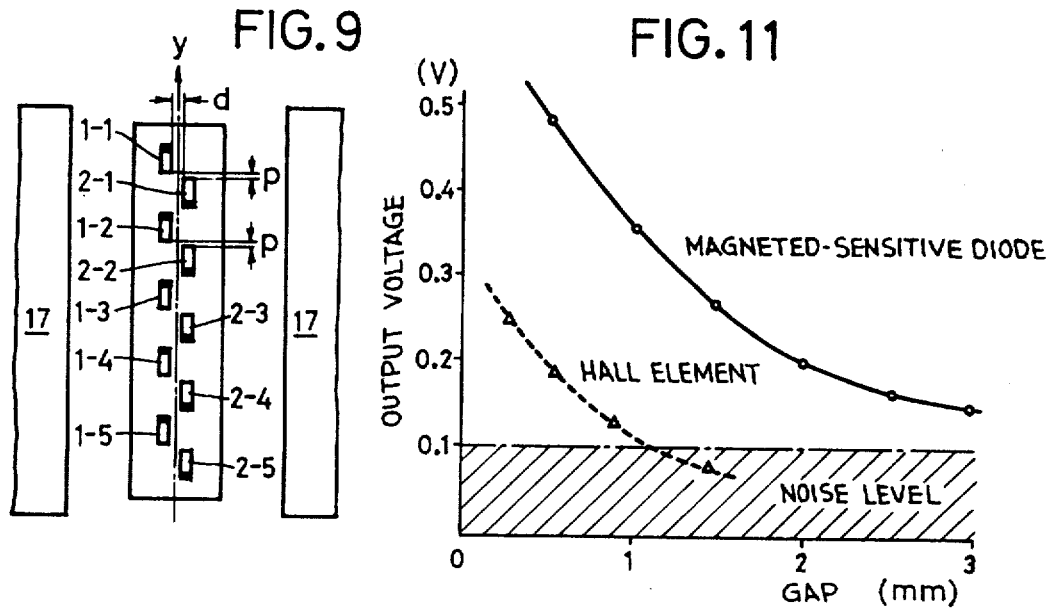
FIG. 9
FIG. 11
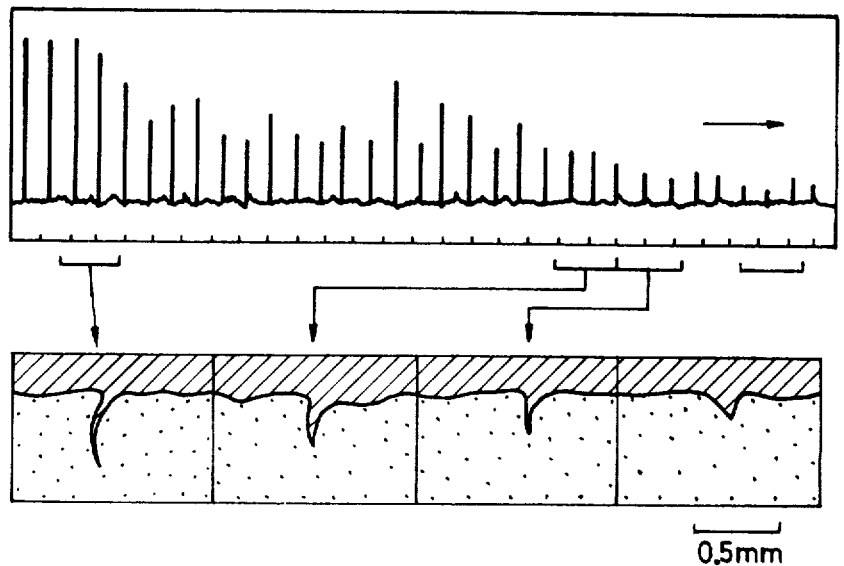
FIG. 10

INVENTORS
TOSHIO SHIRAIWA
TATSUO HIROSHIMA

BY Watson, Cole, Grindle & Watson
ATTORNEYS

INVENTORS,
TOSHIO SHIRAIWA
TATSUO HIROSHIMA

BY Watson, Cole, Grindle & Watson
ATTORNEYS

METHOD AND APPARATUS FOR MAGNETIC FLAW DETECTION BY USING MAGNETO-SENSITIVE DIODES

This invention relates to magnetic flaw inspecting apparatus using magneto-sensitive diodes as means of detecting flaws in such magnetic materials as round steel bars and pipes.

A magnetic flaw detecting method is a kind of non-destructive inspection method for detecting any discontinuous part present in a magnetic body. Its principle is to detect a magnetic leakage flux from the discontinuous part such as the flaw by various methods when a magnetic body is magnetized.

The amount of the magnetic leakage flux caused by the flaw varies with the depth, width, shape, etc. of the flaw. It has been confirmed, however, that when the flaws are of substantially the same width, shape, etc., the amount of the magnetic leakage flux is proportional to the depth of the flaw. From this result it is possible to learn the depth of the flaw by measuring the amount of the magnetic leakage flux and the automatic magnetic detection can be quantatively realized.

A magnetic particle inspection method which has been employed widely comprises the steps of attracting the magnetic particles to the flaw by the above mentioned magnetic leakage flux and effecting a visible observation of formation of a magnetic particle pattern, thereby locating the flaw. However, such a magnetic particle inspection method has the disadvantage that a quantative measurement and objective inspection of the flaw can not be made, and besides its inspection rate is slow so that an on-line inspection corresponding to the rolling velocity of the stock material is impossible.

Furthermore, an inspection method recording the magnetic leakage flux onto a magnetic recording tape, in which the flaw detection must be carried out by closely fitting the tape to the surface of the material to be inspected, has the disadvantage that it is not suitable for inspecting materials having a rough surface such as hot-rolled (billet) material. Moreover, according to a searching coil inspection method wherein the flaw is detected by a voltage generated in a coil by the amount of the magnetic leakage flux linking with the coil it is difficult to set the coil in response to the leaking state of the magnetic leakage flux, as described later, so that the flaw detecting sensitivity remains low.

In a method of detecting the magnetic leakage flux wherein a Hall generator is adopted, such as disclosed in British Pat. No. 1,169,752 by the present applicant, an automatic magnetic flaw inspecting method can be carried out, but the magnetic sensitivity of the Hall generator is low.

In the flaw detecting method and apparatus using magneto-sensitive diodes as in the present invention, the magnetic flaw detector is made by utilizing the fact that the variation of the self resistance value by the direction and size of the magnetic field can be easily detected. The magneto-sensitive diode is so small that it is capable of detecting the magnetic leakage flux generated from a very small flaw.

In case of the Hall generator the magnetic leakage flux generated from a very small flaw was difficult to be detected. The magneto-sensitive detector is so small that it is able to detect fine flaws or small magnetic leakage flux. There is a great advantage that an output voltage several hundred times as high as a the Hall generator is obtained. The signal to noise ratio is very high.

In view of the defects of the above described conventional methods, the present invention provides a novel non-destructive inspection technique by using the various excellent characteristics of magneto-sensitive diodes wherein flaws are detected from the magnetic leakage flux in a magnetized material having a circular cross section as it is propelled in the axial direction while being rotated. Sets of two magneto-sensitive diodes are mounted adjacent to the material to be inspected about a magnetic center axis and are differentially amplified so that noises detected by the respective magneto-sensitive diodes may be canceled in common. Both poles of a high frequency exciting electromagnet are mounted adjacent to the material to be magnetically inspected. The diodes are separated by a distance equal to the distance between the peaks of the magnetic leakage flux. A plurality of sets of automatic balancer circuits, equal in number to the diode sensors, for automatically minimizing a detecting signal caused by magnetic flux leaking between the magnetic poles are also provided. A single unifying circuit is provided to select only the maximum detected value so that sorting, marking, counting and recording may be made from the output signal of the unifying circuit.

The present invention also provides a detecting head having many detectors and an apparatus wherein the flaws are automatically detected by selecting one output from the plurality of detecting outputs.

The present invention also provides a non-destructive inspection apparatus by using multiple detectors and associated amplifying circuits and demodulating circuits as well as a single for selecting one, of circuit unifying the detected outputs from the respective circuits and respective output circuits automatically sorting, evaluating and handling the outputs of the unifying circuit.

The present invention further provides an apparatus for detecting flaws in such materials as round steel bars and pipes by using many detecting units.

With the flaw inspecting method and apparatus of the present invention, even a material to be inspected having some camber can be inspected to detect any substantial flaw without requiring the camber to be straightened. When the multiple detecting units of the present invention are connected, the inspecting speed becomes several times higher than before and a remarkable increase of the inspecting efficiency can be expected.

The flaw detector to be fitted to a detecting unit according to the present invention can be applied to all non-destructive inspections. For example, there are provided an ultrasonic flaw detecting apparatus wherein flaws are detected by water jet coupling or in a liquid, a magnetic flaw inspecting apparatus wherein a Hall generator or a magnetic resistance element varying its electric resistance with the variation of a magnetic field is mounted in the magnetic field and an eddy current flaw inspecting apparatus wherein a detecting probe is combined with an exciting coil. Further, a universal flaw inspecting method and apparatus are provided in which the distance between the feeding roll and supporting roll and their pitch angles are adjusted so that the straight advance and the spiral rotary propelling of a cylindrical material to be inspected may be freely selected and which has side uses for not only the detection of flaws on the entire surfaces of materials but also the detection of the camber of welded pipes of a high efficiency and high inspecting speed.

Therefore, a first object of the present invention is to provide a flaw inspecting method and apparatus having a detecting sensitivity higher than that of a search coil or Hall generator by using magneto-sensitive diodes.

A second object of the present invention is to provide a flaw inspecting method and apparatus wherein an automatic detection can be made by selecting detected outputs from many detectors.

A third object of the present invention is to provide a method and apparatus wherein a flaw detector is borne rotatably in the advancing direction and transverse direction of a material to be inspected, multiple detecting units are mounted adjacent to the above mentioned material and connected at any desired intervals and a device for feeding the above mentioned material is movable with respect to the above mentioned detecting unit so that the material may be inspected to detect flaws.

A fourth object of the present invention is to provide a inspecting method and apparatus wherein flaws in small diameter round bars and pipes can be very simply detected.

In the accompanying drawings:

FIG. 9 is a plan view of FIG. 8 showing the arrangement of magneto-sensitive diodes in the detecting head;

FIG. 10 is a diagram showing an example of flaw detecting results from the apparatus according to the present invention;

FIG. 11 is a relative curve diagram of the output voltage and gap showing a comparison of the flaw detecting sensitivity of the present invention with that of a Hall generator inspecting apparatus;

Figure 1:
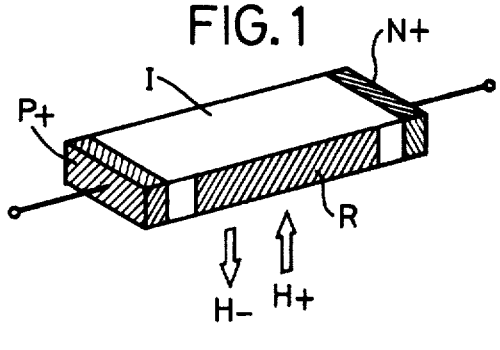
FIG. 1 is a view of a basic formation of a magneto-sensitive diode to be used in the present invention.
Figure 2:
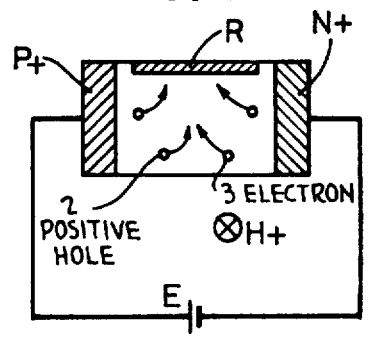
FIG. 2 is a view for explaining the principle of the operation of the diode in FIG. 1.

With reference to FIGS. 1 to 10, the magneto-sensitive diode to be used in the present invention has the basic formation as in FIG. 1 and is characterized in that a recombined section R is deposited by evaporation or the like on the side surface of the I section of a PIN diode and the number of positive holes and the recombination rate of electrons in the I section semiconductor are very high. Now, when an electric source E is connected as in FIG. 2 and an electric current is applied in the P → N direction, under the influence of a magnetic field H acting on the diode, the positive holes and electrons directed into the I part from the PI and NI junction deviate to the R section and the recombination rate is accelerated, therefore the number of the positive holes and electrons in the I part is reduced, the self-resistance increases and the current reduces, the resistance variation rate can be taken to markedly increases.

The present invention is to be used as a detector for magnetically detecting flaws by detecting the variation in resistance influenced by the direction and size of the magnetic field.

As described above, the magneto-sensitive diode to be used in the present invention is particularly better as a magnetic detector than any conventional search coil and Hall generator in that its shape and dimensions can be made the same as or smaller than those of any conventional Hall generator so that it may be adapted to detect magnetic leakage fluxes produced by very fine flaws. Also, the apparent resistance of the diode element reduces, the resistance variation rate can be taken to be large, the output voltage for the intensity of a magnetic field of an order of several gausses produced from a flaw is obtained in a magnitude several hundred to 1,000 times as large as that of a conventional detector, no large amplification is required and the signal to noise ratio is greatly improved.

Figure 3:
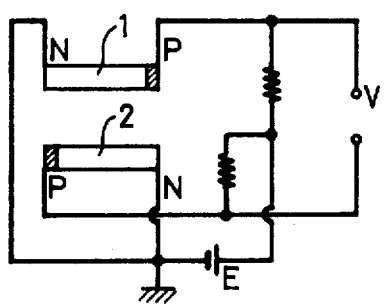
FIG. 3 is a view of a principle circuit for magnetic flaw detection.

FIG. 3 shows an analogous circuit for the magneto-sensitive diodes in magnetic flaw detection. The magneto-sensitive diodes 1 and 2 have different directions of resistance variation, that is, the increase and decrease of the self-resistance depending on the magnitude and direction of the magnetic field relating to the diodes and are therefore so formed as to detect with a high sensitivity any slight magnetic leakage flux caused by the presence of a flaw by differentially wiring two diodes of equal characteristics.

Figure 4:
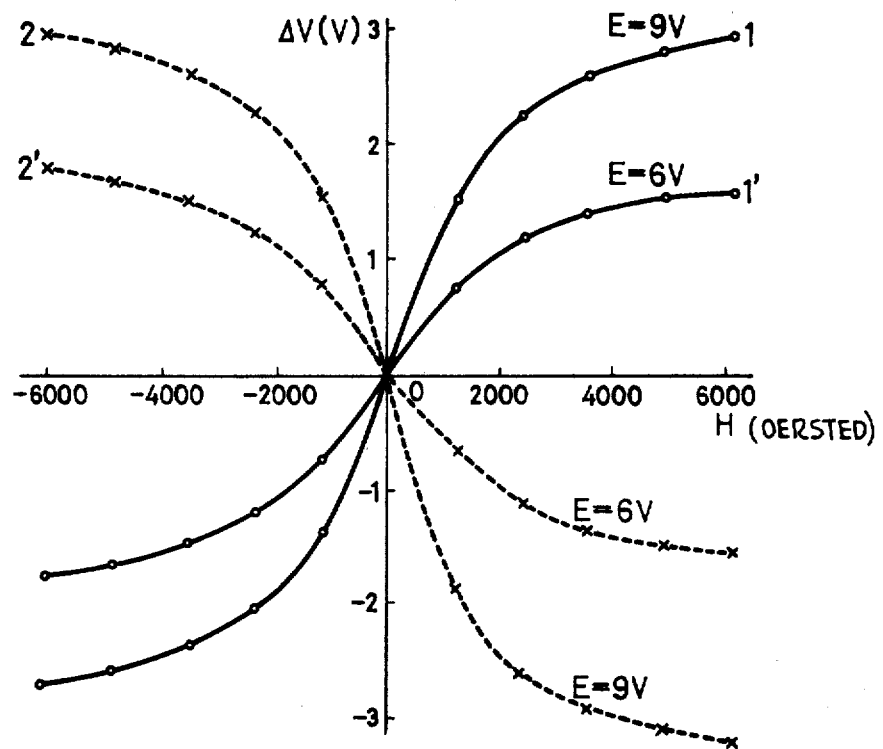
FIG. 4 is an output voltage variation curve diagram vs. the magnetic field variation.
Figure 5:
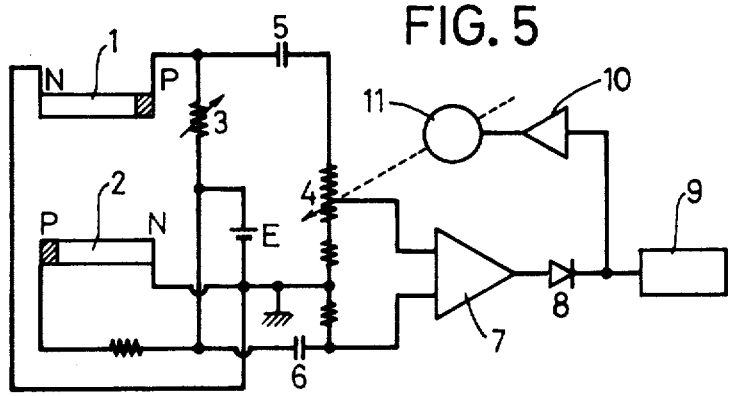
FIG. 5 is a view showing an embodiment of a single detecting circuit formation of a magnetic flaw inspecting apparatus of the present invention.

In FIG. 4, the relations between the applied voltage E and output voltage $\Delta V$ of the respective magneto-sensitive diodes in the same circuit are plotted. That is to say, where the self-resistance of the diode is R0 when the magnetic field is zero H0, the output voltage is $V0$ at this time and the resistance is R1 and the output voltage is $V1$ when the magnetic field is H1, the output voltage difference $$\Delta V = V0 - V1$$

is determined for two kinds of applied voltages with the magnitude and direction of the magnetic field FIG. 5 shows an embodiment of the magnetic flaw detecting circuit of the present invention wherein magneto-sensitive diodes are used as detectors. The variable resistance 3 is an adjusting resistance for controlling the operating points of the two magneto-sensitive diodes 1 and 2 and arranging the voltage-current characteristics of the two diodes so that the magnetic field-voltage characteristics may be the same. Further, the variable resistance 4 is a balancing resistance for equalizing the output voltages of the two magneto-sensitive diodes and feeding a proper input to a differential amplifier 7. That is to say, so that the output of the differential amplifier 7 may be minimal or zero and the outputs of the two magneto-sensitive diodes may be equal to each other, the detected output is demodulated by diode 8 and fed to a servo-amplifier 10. A servo motor 11 is driven by the output of the amplifier, the balance resistance 4 is automatically adjusted so that the outputs of the diodes 1 and 2 at the time of a fixed magnetic field H may be minimized and only the magnetic leakage flux by a flaw is differentially detected to improve the signal to noise ratio and automatically increase the detecting sensitivity. In the drawing, the condensers 5 and 6 inserted between the variable resistance 4 and the magneto-sensitive diodes are required in the case of magnetizing a material to be inspected at a high frequency and are to prevent a direct current when the alternating current part of a magnetic leakage flux detected by a flaw is fed to the next stage.

Figure 6:
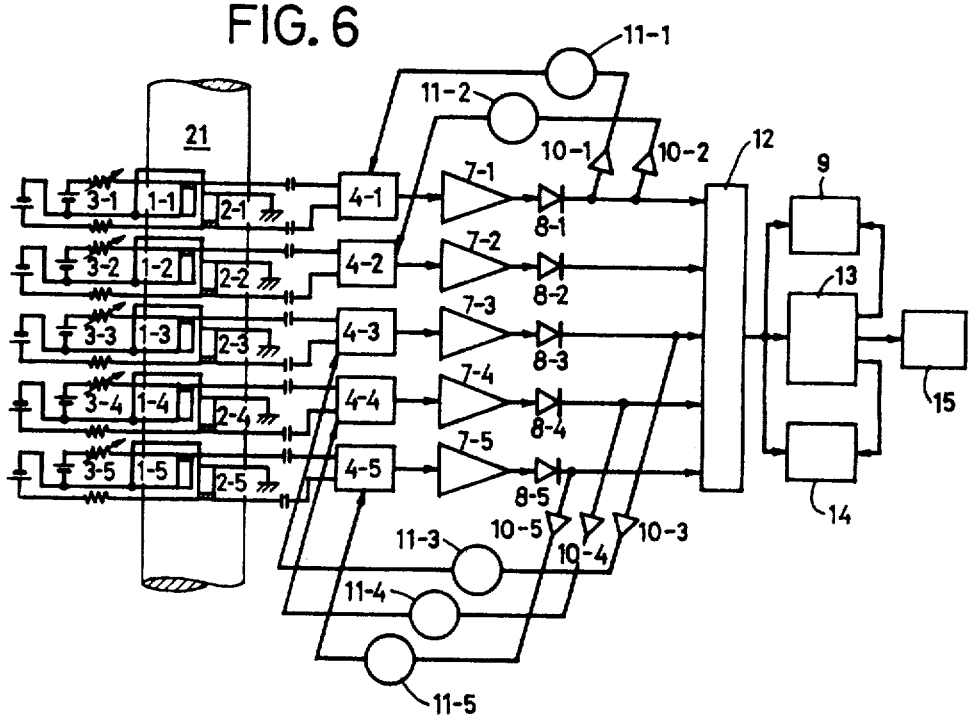
FIG. 6 is a general block diagram showing an embodiment of the apparatus of the present invention having a circuit formation of many detectors attached to a single detecting head.

The formation of a flaw detecting apparatus of the present invention in practice is shown in block diagram form in FIG. 6. The detecting units consisting of respectively differentially wired magneto-sensitive diodes (1-1 and 2-1) — (1-5 and 2-5) — are set along the axis of a material 21 and are respectively provided with a series of operating point adjusting resistances 3-1, —, balancing resistances 4-1, —, differential amplifiers 7-1, —, demodulating circuits (8-1 —, servo-amplifiers 10-1, — and servo-motors 11-1, — so as to provide respective inputs for a single unifying circuit 12. In this unifying circuit, only the maximum detected value is selected as a pulse from among the detected values of the respective detecting units and is level-sorted at 13. The material is automatically sorted as a passed article, a faulty article or an article to be repaired. A flaw having a value larger than a predetermined standard value is automatically colored and marked with a marker according to the depth of the flaw. The length of the flaw is counted with a counter or, as required, is recorded or observed with a recorder 9 or oscilloscope.

Figure 7:
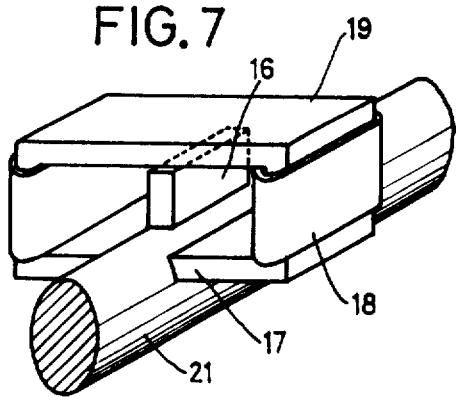
FIG. 7 is a schematic perspective view of a detecting head mechanism.
Figure 8:
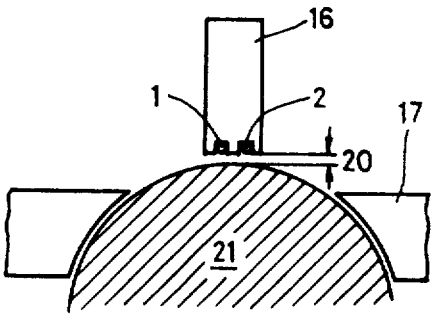
FIG. 8 is a partly sectioned view of FIG. 7 as seen from the front.

A detecting head containing magneto-sensitive diodes is shown in FIGS. 7 to 9. There is provided a head 16 having a gap 20 of 0.3 to 2.0 mm. from a material 21 to be inspected and having magneto-sensitive diodes 1 and 2 mounted at the forward end. The head is a block made of a nonferrous metal such as, for example, copper and having magneto-sensitive diodes replaceably embedded in a proper thin stainless steel plate liner or the like provided in the lower part. An electromagnet 19 having coils 18 wound on its is arranged so that the forward ends 17 of the magnetic poles may be adjacent to the material to be inspected and is excited at a high frequency to give a stabilized magnetic field to the flaw detecting part.

If it is alternately excited with a commercial frequency, there is an advantage that no special electric source is required but there is a disadvantage that it can not follow the high inspecting speed. Therefore, in the apparatus of the present invention, a high frequency electromagnet is used, 1,600 ampere turns are used for the flaw detection of a magnetic round steel material of a diameter, for example, of 50 mm and, as shown in FIGS. 7 and 8, the forward ends of the magnetic poles are made acute angles and are set adjacent to the material to be inspected so that a stabilized magnetic flux may be concentrated in the flaw detecting part. The frequency of the exciting current to be used is determined by the frequency of the detecting flaw signal. Now, if it is supposed that the magnetic leakage flux produced from a flaw is produced from one end of the flaw and enters the other end, that is, the flaw width W mm. is equal to the wave length of the flaw signal and its magnetic leakage flux is detected with the number $b$ of the magneto-sensitive diodes, the frequency $Fs$ in Hz of the flaw detecting signal is theoretically calculated by the formula $$Fs = (2\pi r \ RPS/2b + w)$$

wherein $r$ is a radius of the material to be inspected and RPS is the number of revolutions per second of the material to be inspected. However, as it is desired for the exciting current to always have the momentary maximum value once in a half cycle of the flaw signal, the relation between the frequency $Fe$ of the exciting current and the flaw detecting frequency $Fs$ becomes $$Fe \geq 2 \cdot Fs$$

and, by further taking reproducibility into consideration, it is desirable for such high speed flaw detection as in the present apparatus to have $$Fe \geq 3 \cdot Fs$$

Therefore, in order to spirally drive the material to be inspected at a speed of more than 100 revolutions per minute and to carry out reproducible flaw detection, it is preferable to make the frequency of the exciting current more than 300 Hz. In previous detectors wherein, the Hall generator was used for the detector, the output voltage by the magnetic leakage flux from the flaw was small and when the frequency was made high, the inductive noise would be increased and the ratio of signal to noise would be decreased, and consequently the exciting frequency could only be made so high. In the present invention wherein the magneto-sensitive diode is used for the detector, the electro-sensitivity of the magneto-sensitive diode is high and accordingly it is possible to make the exciting frequency high. By making the exciting frequency high there are obtained the advantages such that (1) the rotation of the material to be inspected can be increased and (2) the density of magnetic flux on the surface of the material to be inspected becomes high, the magnetic leakage flux from the flaw becomes large and the ratio of signal to noise becomes large. Taking these advantages into consideration, the exciting frequency may properly be set in a range of 500 Hz to 10 KHz.

One of the technical problems of whether the magnetic flaw detecting apparatus using magneto-sensitive diodes according to the present invention exhibits a sufficient flaw detecting capacity or not is the arrangement of the magneto-sensitive diodes (1-1 and 2-1), — (1-$i$ and 2-$i$) — formed in sets of two.

Figures 3A, 3B:
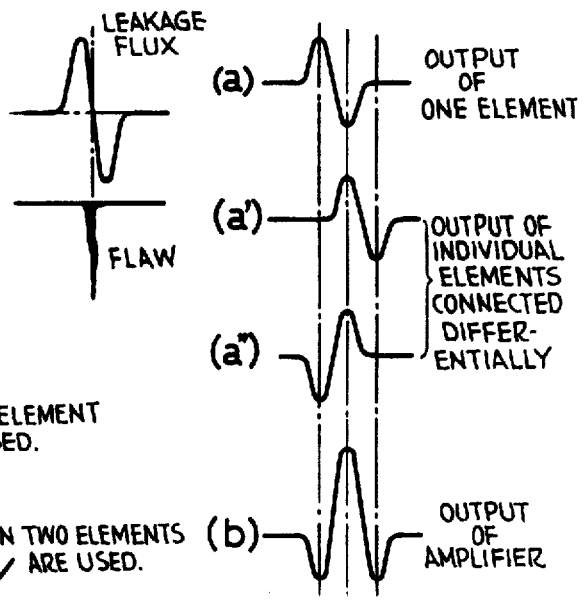
FIGS. 3A, 3B and 3C are respectively a diagram showing the magnetic leakage flux; a curve of an output to be detected by one magneto-sensitive diode; and a curve showing single and dual detector outputs of two magneto-sensitive diodes.

FIG. 3A is a diagram showing the general state wherein the magnetic leakage flux is leaked from the discontinuous part such as the flaws. In this state the peaks have a different polarity from the center of the flaw. The distance between the peaks is varied with the variation of the width of the flaw and the value of peak corresponds to the depth of the flaw.

The magnetic leakage flux is detected by the magneto-sensitive diodes. Now, if one magneto-sensitive diode is used to detect the magnetic leakage flux, its output will be as shown in FIG. 3B($a$). If two magneto-sensitive diodes are disposed at the peak of the magnetic leakage flux and their outputs connected differentially, an output which is twice as much as that in the case of one diode will be obtainable, as shown in FIG. 3B($b$).

Figure 3C:
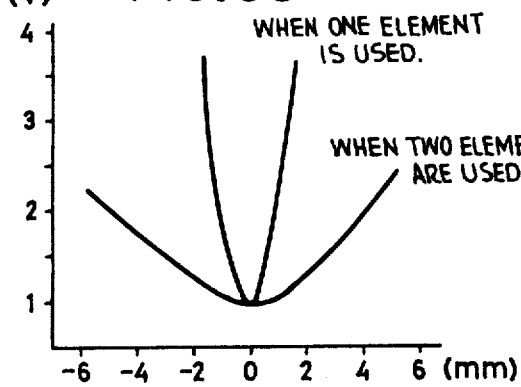

Further, when two magneto-sensitive diodes are used, as mentioned above, the variations of the space magnetic flux leaking between the magnetic poles caused by the change in the relative position of the material to be inspected and the electromagnet for excitation derived from the camber or eccentricity of the material to be inspected are detected in common in the two electro-sensitive diodes, so that such variations may cancel each other. FIG. 3C shows an example of the above case. In the case of one magneto-sensitive diode, when this diode is moved between the magnetic poles from the center therebetween, a range where the amount of space magnetic flux is small is narrow. On the other hand, in case of two magneto-sensitive diodes, it will be obvious that the range becomes wider as compared with that of one magneto-sensitive diode. With the reasons as above mentioned, in the present invention a set of two magneto-sensitive diodes are spaced apart a distance between the peaks of the magnetic leakage flux. Since the split flaw caused by the normal rolling mill is approximately 1 to 2 mm, a circumferential space ($d$) between two magneto-sensitive diodes is preferably 1 to 2 mm.

Further, an axial space (P) between two magneto-sensitive diodes is determined by the length of a minimum flaw to be detected and the spiral feeding pitch of the material to be inspected. Normally, it is adequate to arrange these magneto-sensitive diodes to be in a zigzag form with a shift from each other by about 1 mm.

FIG. 10 is an example of an inspection chart which was obtained when natural flaws present in a hot rolled round steel bar of a diameter of 50 mm. were detected by means of an apparatus of the present invention and in which a detecting signal of one pulse per rotation is clearly shown. As the detected results are shown in response to the microscopic photographs of the cross sections of the flaws below the chart, it is shown that natural flaws of a depth of more than 0.3 mm. can be well detected on an industrial scale at a low noise level.

Further, it is shown in FIG. 11 that the method of the present invention has a sensitivity and reliability far higher than of the Hall generator inspecting method previously developed by the present inventors.

As evident from the comparison, it is shown that, in the apparatus of the present invention, even if the gap 20 (in FIG. 8) between the material to be inspected and the magneto-sensitive diode is made 2 mm., it is possible to detect flaws. It is thus evident that the present invention is a flaw detecting method superior to the Hall generator inspecting method.

Now, an apparatus wherein detecting outputs from many detectors are unified and are automatically detected shall be explained with reference to FIGS. 12 to 18.

Figure 12:
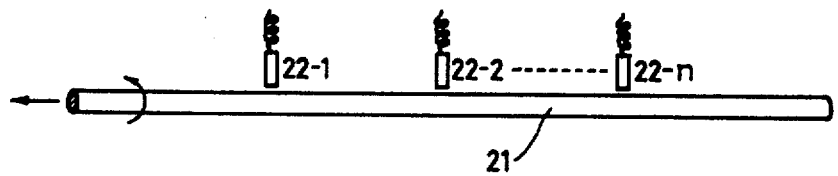
FIG. 12 is a view showing an embodiment of a device for automatically selecting one of many detected outputs in the apparatus according to the present invention.

Shown in FIG. 12 is an example of a commercial system to increase the speed of a flaw detecting method and is a high speed inspecting method wherein an axial feed and rotation are given to material 21 having a circular cross section such as a round steel bar or steel pipe and multiple detectors 22-1, — 22-$n$ are made to spirally scan the surface of the material to be inspected. The multiple detectors are set at fixed intervals and the entire length of the material to be inspected is inspected with the respective detectors so that the inspecting speed may be increased. Here, the detector represent searching units (probes) in the case of a ultrasonic flaw detection, Hall generator, magnetic resistance effect elements or magneto-sensitive diodes in the case of a magnetic flaw detection and searching coils in the case of an eddy current flaw inspection.

Figure 13:
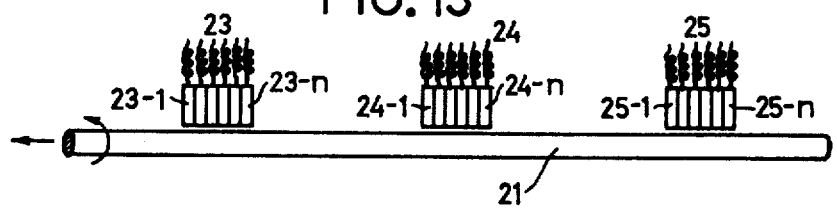
FIG. 13 is a view showing another embodiment of the same as in the above.
Figure 14:
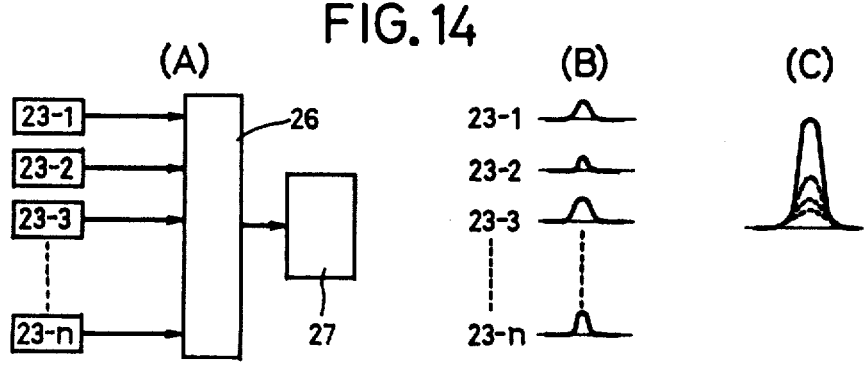
FIG. 14A is a block diagram for explaining a conventional impedance matching device.
FIGS. 14B and 14C are wave form curve diagrams of inputs and outputs.

In the above described inspecting method, if the spiral inspecting pitch is made larger to increase the inspecting speed, it is likely to become impossible to detect short flaws. Therefore, in order to increase the detecting pitch per detector, it is necessary to take care of the minimum detected flaw length by providing multiple detector groups 23, 24, 25, — each consisting of n detectors as shown in FIG. 13. On the other hand, each detector is so small as to be of an effective detecting width generally of several mm. so that smaller natural flaws may be sensitively detected at a high sensitivity. Therefore, even if the minimum flaw detecting length is 10 mm., many detectors must be parallely provided. As a result, such output operations as of evaluating, marking and sorting detecting signals become more complicated. For one of the objects of simplifying them, the impedance matching method shown in FIG. 14 is considered. In this method, n detectors 23-1, 23-2, — 23-n are connected to an output circuit 27 through a proper impedance matching device 26. However, in case such flaws as are shown in FIG. 14B are simultaneously detected by n detectors, the output wave form to the output circuit 27 becomes the sum of the respective detecting signals as is shown in FIG. 14C. The evaluation of the depth or the like of the detected flaw can not be judged with a digital amount. A very shallow long flaw appears as a large output. The method is not practical except for merely knowing whether there is a flaw. It is not adapted for ordinary inspection.

Figure 15:
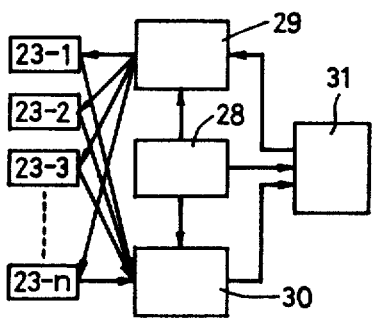
FIG. 15 is a block diagram for explaining a conventional electronic switch.
Figure 16:
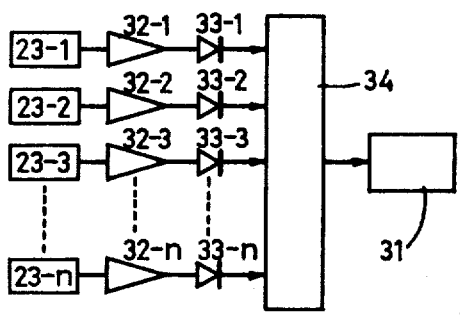
FIG. 16 is a basic block diagram of an automatic inspecting apparatus.

Another method is considered is the utilization of an electronic switch circuit shown in FIG. 15. In this method, clock pulses are generated by using a clock pulse generator 28 and $n$ detectors 23-1, 23-2 — 23-n are connected to a control output circuit 31 through electronic switch circuits 29 and 30 but the electric circuit is more complicated and costly and the maintenance and adjustment are also complicated and difficult.

Figure 17:
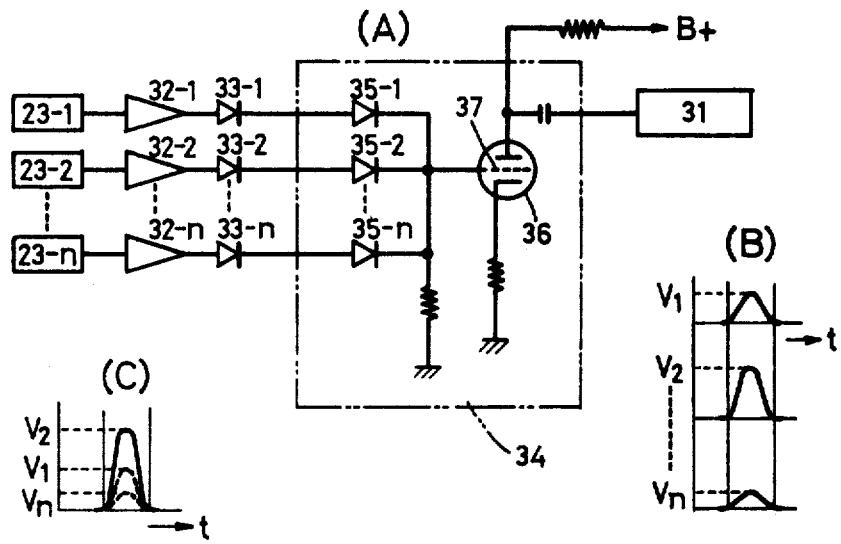
FIG. 17A is a unifying circuit diagram of the apparatus shown in FIG. 16.
FIG. 17B and 17C are input and output wave form curve diagrams of the circuit shown in FIG. 17A.

The present invention is to improve the defects of the above mentioned conventional methods and to make it possible to automatically detect flaws at a high speed by selecting only the maximum value of the detecting outputs from many detectors with a simple electric circuit formation. The basic formation of the flaw inspecting apparatus of the present invention is shown in the block diagram in FIG. 16 and the details of the unified circuit are shown in FIG. 17. As illustrated, the waves of the respective detectors 23-1, 23-2, — 23-n are amplified and detected respectively through amplifiers 32-1, 32-2, — 32-n and demodulators 33-1, 33-2, — 33-n to provide direct current signals and applied as inputs to a single circuit 34. As shown in FIG. 17A, in that circuit the direct current signal of each of n the above mentioned wave detectors is connected to the anode of each of n rectifying elements (35-1, 35-2, — 35-n) such as diodes, the number of which is the same as the wave detectors, and the cathodes of n rectifying elements are connected in common and to the input, i.e. a grid 37, of, for example, a triode 36 of the next stage so that, in case demodulating outputs $V_1, V_2, — V_n$ (in FIG. 17B) from the respective detectors 23-1, 23-2, — 23-n come in simultaneously in the same phase, only those of the maximum potential may be taken out, as is shown in FIG. 17C and may be made an input to an output device 31 in the next stage for analyzing, sorting and recording signals.

By applying the above mentioned unifying circuit to a practical flaw detecting apparatus, it is very easty to detect the depth and length of any long flaw present in the lengthwise direction of a material to be inspected. That is to say, though the long flaw ranges over a multiple detectors and is detected simultaneously by the individual detectors, only the deepest flaw part is always detected as an output of the unifying circuit 34, therefore only a detrimental flaw can be unmistakably marked and by counting this pulse output, the length of the flaw can be determined.

Figure 18:
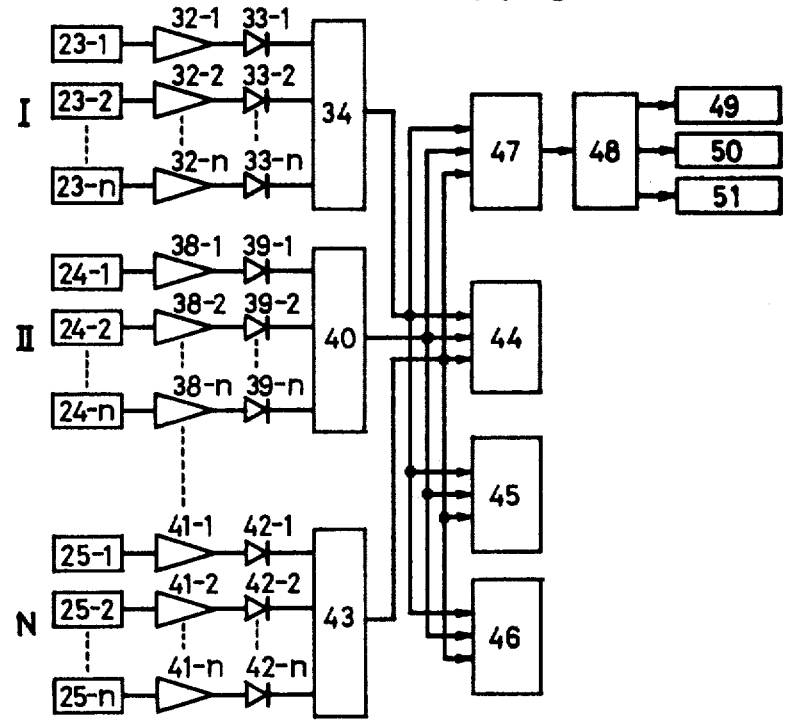
FIG. 18 is a block diagram of the entire apparatus.

FIG. 18 shows an advanced automatic flaw detecting apparatus using the above mentioned selecting circuits in two stages and is a block diagram of an apparatus for automatically inspecting long materials at a high speed within a short time. It has a first flaw detecting group I provided with a first flaw detecting head having n detectors 23-1, 23-2, — 23-n and a first selecting circuit 34 for the outputs of amplifiers 32-1, 32-2, — 32-n and demodulators 33-1, 33-2, 33-n connected to the respective detectors, a second flaw detecting group II for $n$ detectors 24-1, 24-2, — 24-n in the same manner, — and an Nth flaw detecting group for detectors 25-1, 25-2, — 25-n.

In each group, the largest flaw detected in it is recorded at 44 and counted at 45, any detrimental flaw is color-marked at 46 and is made an input for a second selecting circuit 47 provided for the general evaluation of the material to be inspected. The largest flaw depth of each material to be inspected is selected. The judgment whether the material is good, requires repair or is to be made scrap is level-sorted at 48. In response to this sorting signal, automatically a conveyor and kick-out mechanism are driven so that the good material may be designated to be delivered to the next step 49, the material required to be repaired may be designated to be delivered to a rack 50 for a repair shop and the scrap material may be delivered to a scrap rack 51. Thus various necessary output operations are automatically made.

What is claimed is:

1. Magnetic detection apparatus for detecting flaws in material spirally rotated along its longitudinal axis to expose the entire surface thereof to the detection apparatus and having means for magnetizing said material comprising:

a plurality of pairs of at least two detector elements for detecting the leakage flux emanating from a flaw in said material, said detector elements are symmetrically mounted one on each side of a null plane formed by said means for magnetizing;

means for amplifying the respective outputs of said plurality of pairs of detector elements, means for demodulating the output of said means for amplifying, means responsive to said demodulated outputs for balancing the respective signals from each of said pair of detector elements, means for sensing the largest amplitude signal from said means for amplifying, and means responsive to said means for sensing to generate control signals.

2. Magnetic detection apparatus as in claim 1 wherein said means for sensing comprise a plurality of diodes each responsive to an output from said means for amplifying associated with a respective one of said pair of said detector elements, the outputs of said diode elements are summed at a given point so that only the signal output having the greatest amplitude is recognized, and means interconnecting said point to said means for generating control signals.

3. Magnetic detection apparatus as in claim 1 wherein pairs of said detector elements are formed into respective groups of detecting elements, means for demodulating the output signals from each group of detector elements to provide signals to said means for sensing.

4. Apparatus as in claim 1 wherein each of said detecting elements comprises a magneto-sensitive diode.

* * * * *